US008675229B2

(12) United States Patent
Kawamata et al.

(10) Patent No.: US 8,675,229 B2
(45) Date of Patent: Mar. 18, 2014

(54) IMAGE FORMING APPARATUS INCLUDING A FLUID TRANSPORT DEVICE

(75) Inventors: Kunimasa Kawamata, Kanagawa (JP); Naoto Sugimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 356 days.

(21) Appl. No.: 13/112,614

(22) Filed: May 20, 2011

(65) Prior Publication Data

US 2012/0092703 A1 Apr. 19, 2012

(30) Foreign Application Priority Data

Oct. 14, 2010 (JP) ................................ 2010-231908

(51) Int. Cl.
*G06K 15/00* (2006.01)

(52) U.S. Cl.
USPC ............................ 358/1.15; 358/401; 399/94

(58) Field of Classification Search
USPC ........... 358/1.1, 1.15, 401, 296, 300; 399/94, 399/95, 96
See application file for complete search history.

(56) References Cited

U.S. PATENT DOCUMENTS 7,466,934 B2 * 12/2008 Chae et al. ...................... 399/69
2010/0008694 A1 * 1/2010 Okano et al. .................... 399/94

FOREIGN PATENT DOCUMENTS

JP 2008-242488 A 10/2008

* cited by examiner

*Primary Examiner* — Thomas D Lee
(74) *Attorney, Agent, or Firm* — Sughrue Mion, PLLC

(57) ABSTRACT

An image forming apparatus includes a transport device that transports fluid inside a body of an image forming apparatus; a counting unit that counts a cumulative number of image forming operations; and a transport control unit that controls a start and a stop of operation of the transport device so as to keep the transport device stopped when an image forming operation is started, and to start the transport device when the cumulative number of image forming operations has become larger than or equal to a preset number.

3 Claims, 8 Drawing Sheets

(FIG. 4 Continued)
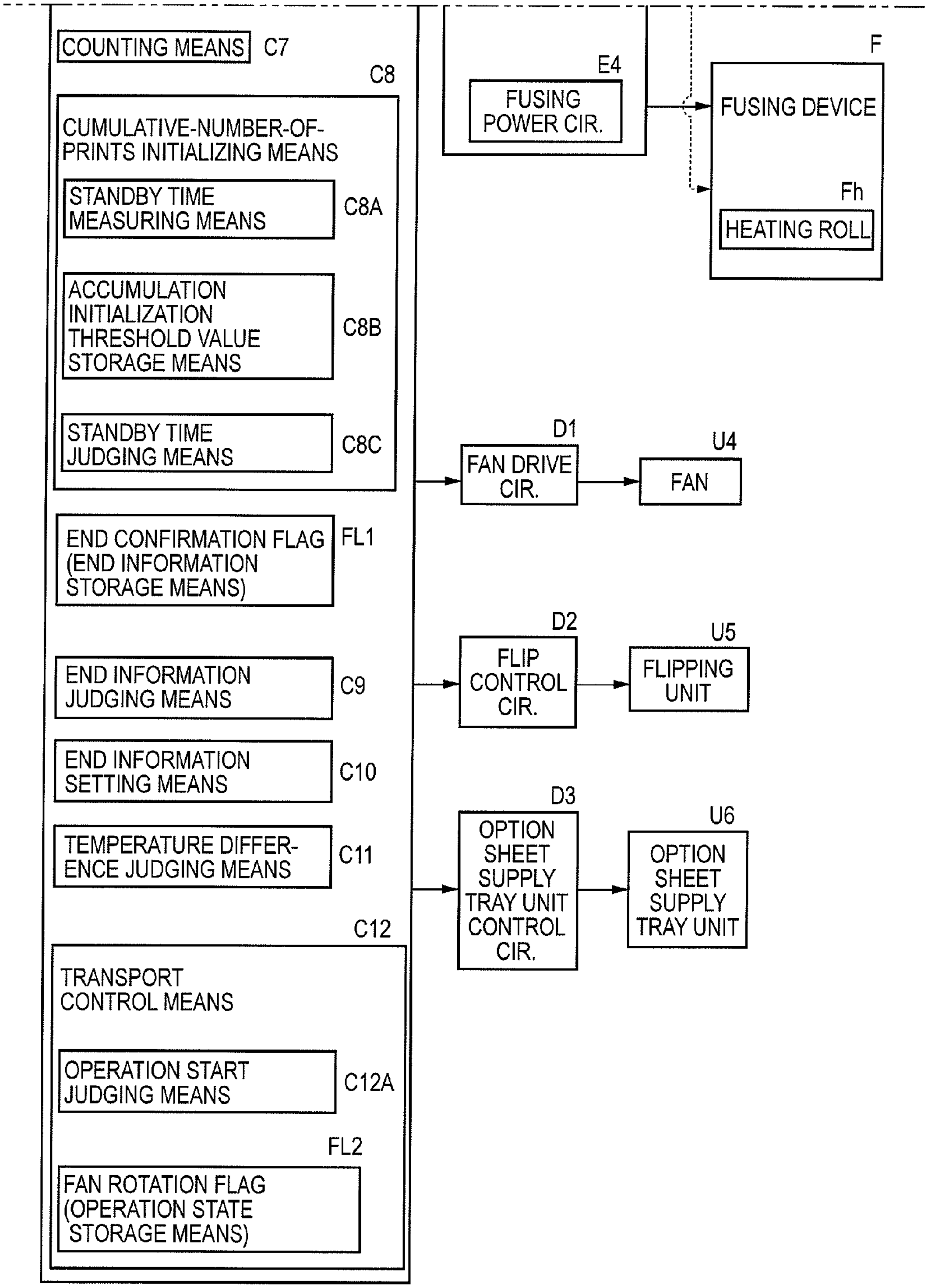

FIG. 5

| | WITH OPTION DEVICES | WITHOUT OPTION DEVICES |
|---|---|---|
| HIGH TEMPERATURE (EXTERNAL TEMPERATURE > 28°C) | 60 IMP | 90 IMP |
| ORDINARY TEMPERATURE (EXTERNAL TEMPERATURE ≦ 28°C) | 74 IMP | 120 IMP |

(CONT.)

(FIG. 6 Continued)
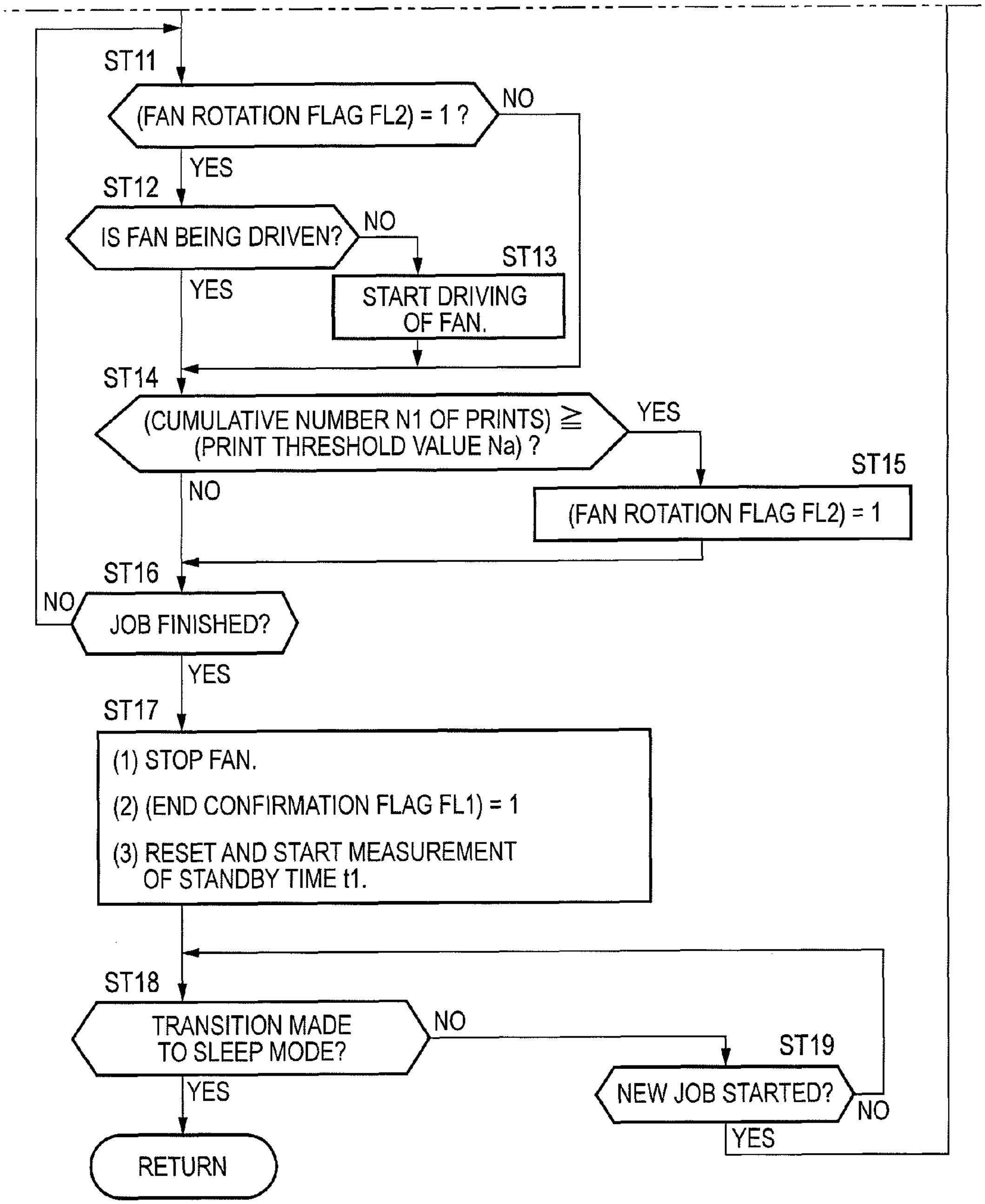

IMAGE FORMING APPARATUS INCLUDING A FLUID TRANSPORT DEVICE

CROSS-REFERENCE TO RELATED APPLICATION

This application is based on and claims priority under 35 USC 119 from Japanese Patent Application No. 2010-231908 filed on Oct. 14, 2010.

BACKGROUND

1. Technical Field

The present invention relates to an image forming apparatus.

2. Related Art

As for image forming apparatus such as printers and copiers, a technique is known which relates to an image forming apparatus that is equipped with fans (example transport devices).

SUMMARY

According to an aspect of the invention, an image forming apparatus include:

- a transport device that transports fluid inside a body of an image forming apparatus;
- a counting unit that counts a cumulative number of image forming operations; and
- a transport control unit that controls a start and a stop of operation of the transport device so as to keep the transport device stopped when an image forming operation is started, and to start the transport device when the cumulative number of image forming operations has become larger than or equal to a preset number.

BRIEF DESCRIPTION OF THE DRAWINGS

Exemplary embodiments of the invention will be described in detail based on the following figures, wherein:

FIG. 5 shows a setting table used in the first exemplary embodiment, and

DETAILED DESCRIPTION

Figure 1:
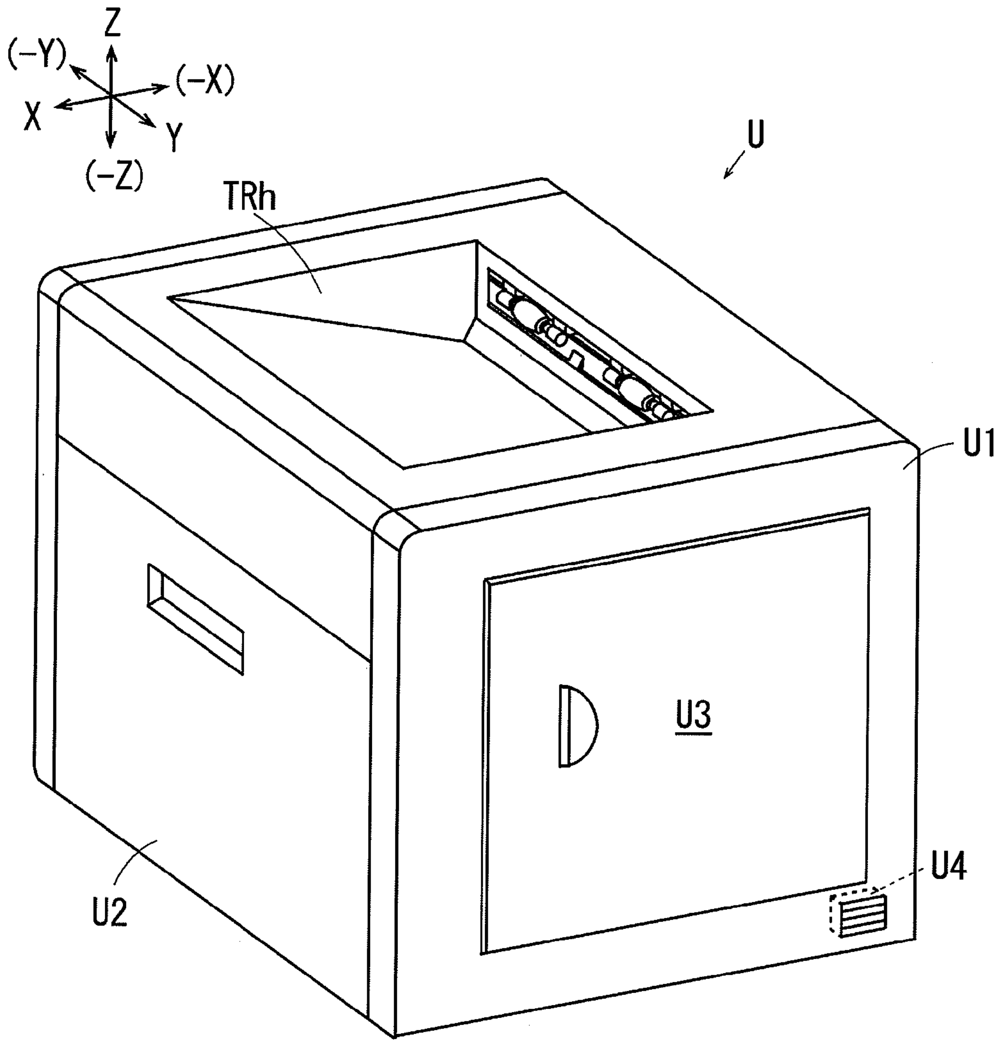
FIG. 1 is a perspective view of the whole of a printer according to a first exemplary embodiment of the present invention.

Although an exemplary embodiment of the present invention will be described below with reference to the drawings, the invention is not limited to the exemplary embodiment.

To facilitate understanding of the following description, in the drawings, the X-axis direction, the Y-axis direction, and the Z-axis direction are defined as the front-rear direction, the right-left direction, and the top-bottom direction, respectively, and the directions or sides indicated by arrows X, −X, Y, −Y, and Z, and −Z are defined as the front direction or side, the rear direction or side, the right direction or side, the left direction or side, the top direction or side, and the bottom direction or side, respectively.

In the drawings, a circle "o" having a dot "." inside means an arrow that is directed from the back side to the front side of the paper surface and a circle "o" having a cross "x" inside means an arrow that is directed from the front side to the back side of the paper surface.

Furthermore, in the drawings, to facilitate understanding, members etc. that are not indispensable for a description may be omitted as appropriate.

Exemplary Embodiment 1

FIG. 1 is a perspective view of the whole of a printer according to a first exemplary embodiment of the invention.

As shown in FIG. 1, the printer U (image forming apparatus) according to the exemplary embodiment of the invention has an apparatus body U1. On the front side of the apparatus body U1, a front cover U2 (example media replenishment opening/closing member) to be opened and closed in replenishing new media is supported so as to be able to be opened and closed with its bottom end as a rotation center. On the right side of the apparatus body U1, a side cover U3 (example container replacement opening/closing member) to be opened and closed in replacing a toner cartridge (e.g., a toner cartridge to be replaced by a new developer toner cartridge or a replacement container in which waste developer has been collected) is supported so as to be able to be opened and closed with its rear end as a rotation center. Toner cartridges TCy-TCk (example developer containers; described later) are supported detachably by the apparatus body U1 inside the side cover U3. The top wall of the apparatus body U1 is formed with an ejected sheet tray Rh, which is an example ejected sheet stack unit.

A fan U4 (example gas transport device) is disposed on a bottom-rear portion of the right side wall of the apparatus body U1 so that cooling air may be introduced into the apparatus body U1. Although, for example, plural fans like the fan U4 are disposed on the left side wall etc. of the apparatus body U1, to simplify the description only the fan U4 is shown in FIG. 1 (the other fans are omitted).

Figure 2:
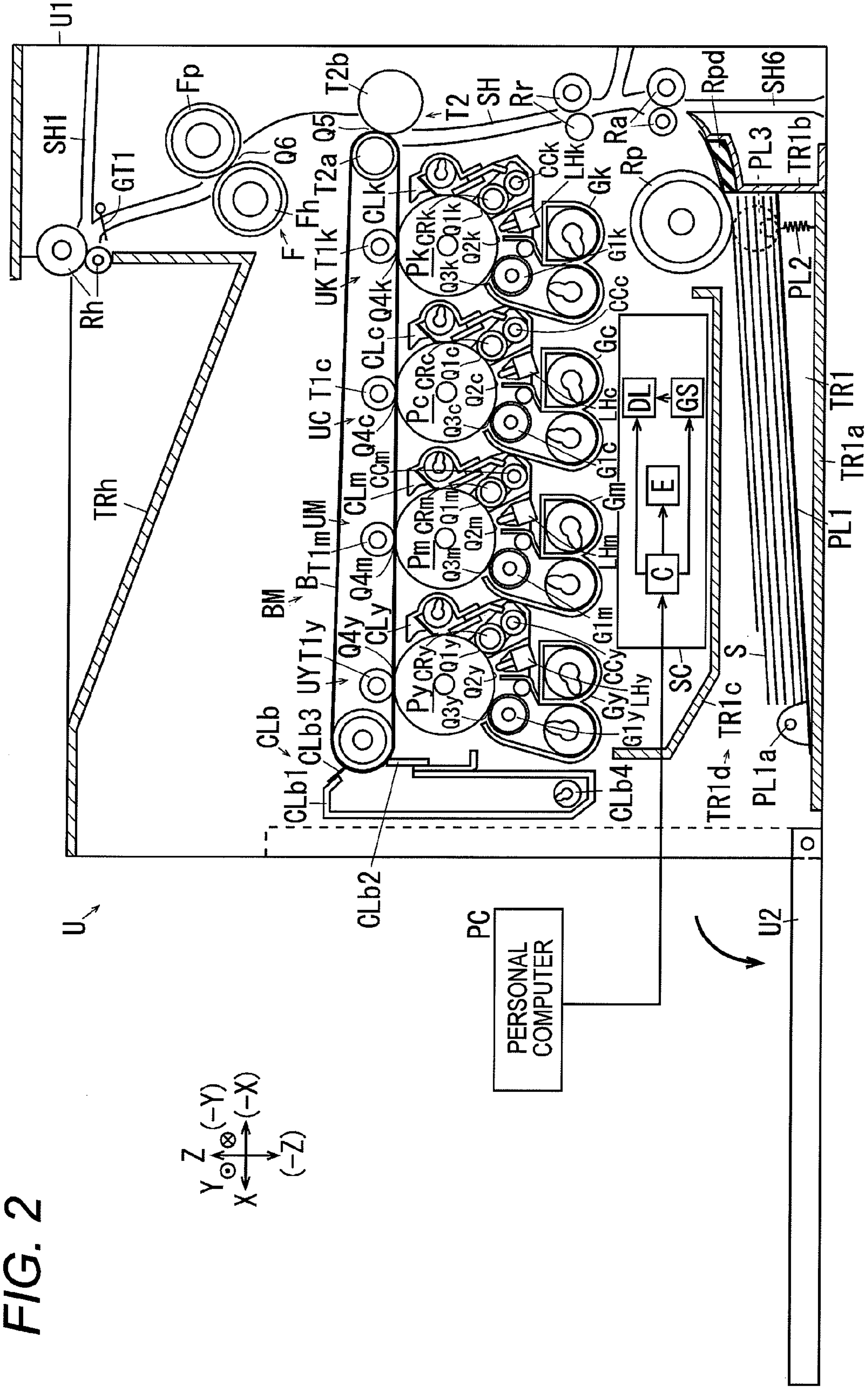
FIG. 2 shows the internal configuration of the printer according to the exemplary embodiment of the invention.

FIG. 2 shows the internal configuration of the printer U according to the exemplary embodiment of the invention.

As shown in FIGS. 1 and 2, the front cover U2 is supported so as to be rotatable between an open position (indicated by solid lines in FIG. 2) where it allows insertion of sheets (example media) and a closed position (indicated by broken lines in FIG. 2).

As shown in FIG. 2, a control board SC which is mounted with various control circuits, storage media, etc. is disposed in the printer U at a low position. The control board SC is provided with a control section C for performing various controls for the printer U, an image processing section GS whose operation is controlled by the control section C, a writing drive circuit DL (example drive circuit for a latent image forming device), a power circuit E (example power device), and other circuits. The power circuit E supplies voltages to charging rolls CRy-CRk (example chargers; described later), developing rolls G1*y*-G1*k* (example developing members; described later), primary transfer rolls T1*y*-T1*k* (example primary transfer devices; described later), etc.

The image processing section GS converts print information that is input from, for example, a personal computer PC (example image information transmitting apparatus) electrically connected to the printer U into pieces of latent image forming image information corresponding to yellow (Y), magenta (M), cyan (C), and black (K), and outputs those pieces of image information to the writing drive circuit DL with preset timing.

When a document image is a monochrome image, image information of only black is input to the writing drive circuit DL.

Having drive circuits of the respective colors Y, M, C, and K, the writing drive circuit DL outputs signals corresponding to the received pieces of image information to LED heads LHy, LHm, LHc, and LHk (example latent image forming devices), respectively, with prescribed timing.

As shown in FIG. 2, image forming devices UY, UM, UC, and UK (example visible image forming devices) for forming tone images (example visible images) of yellow, magenta, cyan, and black are disposed over the control board SC. As shown in FIG. 2, the image forming device UK of black (K) is equipped with a photoreceptor body Pk (example rotary image holding body). The charging roll CRk (example charger) for charging the surface of the photoreceptor body Pk, the LED head LHk (example latent image forming device) for forming an electrostatic latent image on the surface of the photoreceptor body Pk, a developing device Gk for developing an electrostatic latent image formed on the surface of the photoreceptor body Pk into a visible image, a photoreceptor body cleaner CLk (example image holding body cleaner) for removing developer remaining on the surface of the photoreceptor body Pk, etc. are arranged around the photoreceptor body Pk.

The image forming devices UY, UM, and UC of the other colors are configured in the same manner as the image forming device UK of black.

The surfaces of the photoreceptor bodies Py-Pk are charged uniformly at charging regions Q1*y*, Q1*m*, Q1*c*, and Q1*y* by the charging rolls CRy-CRk, respectively, and then latent images are written onto the surfaces of the photoreceptor bodies Py-Pk by the LED heads LH-LHk at latent image forming regions Q2*y*, Q2*m*, Q2*c*, and Q2*k*, respectively. The thus-written electrostatic latent images are developed into toner images at development regions Q3*y*, Q3*m*, Q3*c*, and Q3*k* where the photoreceptor bodies Py-Pk are opposed to the developing devices Gy-Gk, respectively. The thus-produced toner images are conveyed to primary transfer regions Q4*y*, Q4*m*, Q4*c*, and Q4*k* where the photoreceptor bodies Py-Pk are in contact with an intermediate transfer belt B (example intermediate transfer body), respectively. Primary transfer voltages that are opposite in charging polarity to the toners are applied to the primary transfer rolls T1*y*, T1*m*, T1*c*, and T1*k* (example primary transfer devices) which are disposed on the back side of the intermediate transfer belt B at the primary transfer regions Q4*y*, Q4*m*, Q4*c*, and Q4*k*, respectively, with preset timing from the power circuit E which is controlled by the control section C.

Toner images formed on the photoreceptor bodies Py-Pk are primarily transferred to the intermediate transfer belt B by the primary transfer rolls T1*y*-T1*k*, respectively.

Residues and stuck materials such as transfer-residual toner and discharge products remaining on the surfaces of the photoreceptor bodies Py-Pk after the primary transfer are cleaned off the surfaces by the photoreceptor cleaners CLy, CLm, CLc, and CLk, respectively. The thus-cleaned surfaces of photoreceptor bodies Py-Pk are charged again by the respective charging rolls CRy-CRk. Residues etc. that have not been removed by the photoreceptor cleaners CLy-CLk and have stuck to the charging rolls CRy-CRk are cleaned off them by charger cleaners CCy, CCm, CCc, and CCk (example charger cleaning members) which are disposed so as to be in contact with the charging rolls CRy-CRk, respectively.

As shown in FIG. 2, a belt module BM (example intermediate transfer belt unit) is disposed over the photoreceptor bodies Py-Pk. The belt module BM is equipped with the intermediate transfer belt B (example transfer subject body, example intermediate transfer body). The intermediate transfer belt B is supported rotatably by an intermediate transfer support system which is composed of a belt drive roll Rd (example drive member), a backup roll T2*a* (example follower member, example secondary transfer counter member), and the above-mentioned primary transfer rolls T1*y*-T1*k* which are opposed to the respective photoreceptor bodies Py-Pk.

A belt cleaner CLb (example intermediate transfer body cleaner) is disposed in front of the intermediate transfer belt B. The belt cleaner CLb is equipped with a cleaning container CLb1 which extends in the vertical direction, a cleaning blade CLb2 (example cleaning member) which is supported by the cleaning container CLb1 and cleans residues off the surface of the intermediate transfer belt B by contacting the intermediate transfer belt B, a film CLb3 (example leakage preventive member) for preventing scattering and leakage of residues removed by the cleaning blade CLb2, and residue conveying member CLb4 which is disposed in the cleaning container CLb1 at a lower end position and ejects removed residues, that is, conveys them to a collection container (not shown). In the first exemplary embodiment, the bottom end of the cleaning container CLb1 is located at the same level as the bottom ends of the image forming devices UY-UK, that is, the bottom ends of the developing devices Gy-Gk.

A secondary transfer roll T2*b* (example secondary transfer member) is opposed to the portion, in contact with the backup roll T2*a*, of the intermediate transfer belt B. The backup roll T2*a* and the secondary transfer roll T2*b* constitute a secondary transfer device T2 used in the first exemplary embodiment. The region where the secondary transfer roll T2*b* and the intermediate transfer belt B are opposed to each other is a secondary transfer region Q5.

Multi-color toner images that have been transferred to the intermediate transfer belt B sequentially in superimposition by the primary transfer rolls T1*y*-T1*k* at the primary transfer regions Q4*y*-Q4*k*, respectively, are conveyed to the secondary transfer region Q5.

The primary transfer rolls T1*y*-T1*k*, the intermediate transfer belt B, the secondary transfer device T2, etc. constitute a transfer device T1+T2+B used in the first exemplary embodiment.

A sheet supply tray TR1 (example media housing unit) is provided under the control board SC. The sheet supply tray TR1 has a bottom wall TR1*a*, a rear end wall TR1*b* which extends upward from the rear end of the bottom wall TR1*a*, and a top wall TR1*c* which is disposed over the bottom wall TR1*a* so as to be opposed to it. The sheet supply tray TR1 has, as a front space, a replenishment opening TR1*d* for replenishment of new recording sheets S. A front portion of the top wall TR1*c* is inclined so as to go up as the position goes forward in the replenishment opening TR1*d*. As a result, the interval between the top wall TR1*c* and the bottom wall TR1*a* increases (i.e., the replenishment opening TR1*d* becomes wider) as the position goes forward.

An elevation plate PL1 (example media loading unit) which is supported so as to be rotatable about a rotation center PL1*a* and elevates and lowers recording sheets S (example media) mounted thereon is disposed over the bottom wall TR1*a*. An elevation spring PL2 (example urging member) which urges a rear end portion of the elevation plate PL1 is disposed adjacent to the rear end portion of the elevation plate PL1. While no image forming operation is being performed, the elevation plate PL1 is located at a low position and held parallel with the bottom wall TR1*a* as a result of a downward movement caused by eccentric-cam-shaped press-down members PL3 which are disposed at right and left ends. While an image forming operation is being performed, the elevation plate PL1 is supported movably being urged upward by the elevation spring PL2 (see FIG. 2) as a result of rotation of the press-down members PL3.

Therefore, when the front cover U2 is opened, the replenishment opening TR1*d* is exposed to the outside to establish a state that recording sheets S may be mounted on the elevation plate PL1 located at the low position by inserting them until they hit the read end wall TR1*b*.

A sheet supply roll Rp (example send-out member) is disposed behind the top wall TR1*c*. The sheet supply roll Rp is located at such a position that the top one of a stack of recording sheets S is pressed against it by the spring force of the elevation spring PL2 in a state that the elevation plate PL1 located at a high position. A retard pad Rpd (example separation member) is disposed on top of the read end wall TR1*b*.

Recording sheets S housed in the sheet supply tray TR1 are sent out by the sheet supply roll Rp, separated into individual ones in a contact region of the retard pad Rpd and the sheet supply roll Rp, and conveyed to a medium conveyance passage SH. In the medium conveyance passage SH, a recording sheet S is conveyed via conveying rolls Ra (example conveying members) to registration rolls Rr (example adjustment members) for adjusting the timing of supply to the secondary transfer region Q5. After being conveyed to the registration rolls Rr, the recording sheet S is sent to the secondary transfer region Q5 in synchronism with arrival of toner images formed on the intermediate transfer belt B to the secondary transfer region Q5.

After the toner images have been transferred to the recording sheet S at the secondary transfer region Q5, the intermediate transfer belt B is cleaned by the belt cleaner CLb by removing residues such as transfer-residual toner and discharge products from its surface.

The recording sheet S to which the toner images have been transferred is conveyed to a fusing region Q6 of a fusing device F. The fusing device F is equipped with a heating roll Fh (example heat fusing member) and a pressure roll Fp (example pressure fusing member). The fusing region Q6 is a region where the heating roll Fh and the pressure roll Fp are brought into contact with each other at a preset pressure. The unfused toner images on the surface of the recording sheet S are fused by heat and pressure as it passes the fusing region Q6.

The recording sheet S bearing a fused image is conveyed through the medium conveyance passage SH and ejected to the ejected sheet tray Rh via ejection rolls Rh (example medium ejecting members).

An additional connection passage SH1 for flipping (example conveyance passage) branches off the medium conveyance passage SH and is disposed on the right of the ejection rolls Rh. A gate GT1 (example switching member) is disposed in the region where the additional connection passage SH1 branches off the medium conveyance passage SH. In the first exemplary embodiment, the gate GT1 is made of a material capable of elastic deformation, and is disposed so that it is pushed by a recording sheet S and thereby deformed elastically to direct the recording sheet S toward the ejection rolls Rh when the recording sheet S coming from the medium conveyance passage SH passes it and that it recovers elastically after passage of the recording sheet S to guide the recording sheet S coming from the ejection rolls Rh to the additional connection passage SH1.

Figure 3:
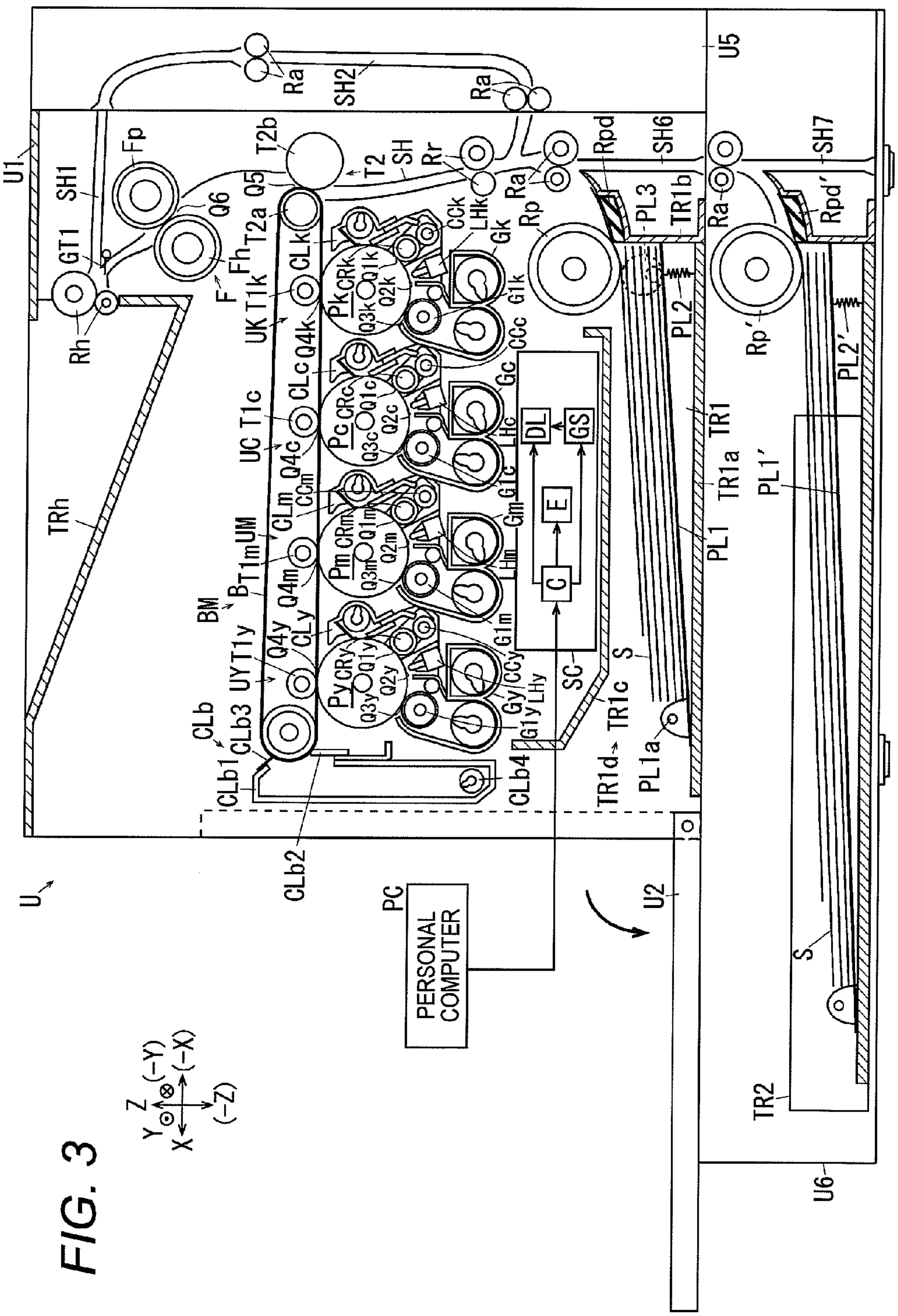
FIG. 3 shows the printer according to the first exemplary embodiment to which a flipping unit and an option sheet supply tray unit (example option devices) are attached.

FIG. 3 shows the printer U according to the first exemplary embodiment to which a flipping unit and an option sheet supply tray unit (example option devices) are attached.

As shown in FIGS. 2 and 3, the printer U according to the first exemplary embodiment is configured in such a manner that the flipping unit U5 (example option device) may be attached to and detached from the rear wall of the apparatus body U1. In a state that the flipping unit U5 is attached to the printer U, the upstream end of a flipping passage SH2 (example internal conveyance passage) of the flipping unit U5 is connected to the right end of the additional connection passage SH1 of the apparatus body U1. The downstream end of the flipping passage SH2 is connected to a portion, upstream of the registration rolls Rr, of the medium conveyance passage SH.

A double-sided print operation is performed in the following manner. After a recording sheet S on whose one surface an image is recorded has been conveyed through the medium conveyance passage SH and its tail has passed the gate GT1, the ejection rolls Rh are rotated reversely and hence the recording sheet S is sent to the additional connection passage SH1 and the flipping passage SH2. The recording sheet S is conveyed by conveying rolls Ra (example conveying members) disposed in the flipping passage SH2 and thereby supplied to the registration rolls Rr again in a state that the recording sheet S is flipped.

As shown in FIGS. 2 and 3, the printer U according to the first exemplary embodiment is configured in such a manner that an option sheet supply tray unit U6 (example option device) may be attached to the apparatus body U1 from below and detached from it. An option sheet supply tray TR2 is formed inside the option sheet supply tray unit U6. The option sheet supply tray TR2 is configured in the same manner as the sheet supply tray TR1 except that the former is longer than the latter in the front-rear direction. As in the sheet supply tray TR1, a sheet supply roll Rp', an elevation plate PL1', etc. are disposed in the option sheet supply tray TR2. A recording sheet S that has been sent out by the sheet supply roll Rp' is conveyed to a second additional connection passage SH6 for sheet supply which is formed inside the apparatus body U1 and extends downward from a position that is downstream of the sheet supply roll Rp. A third additional connection passage SH7 is formed in the option sheet supply tray unit U6 in such a manner that its top end is connected to the second additional connection passage SH6 and it extends downward. As a result, when another sheet supply tray unit is provided under the option sheet supply tray unit U6, a recording sheet S coming from below may pass through the third additional connection passage SH7.

(Control Section C)

Figure 4:
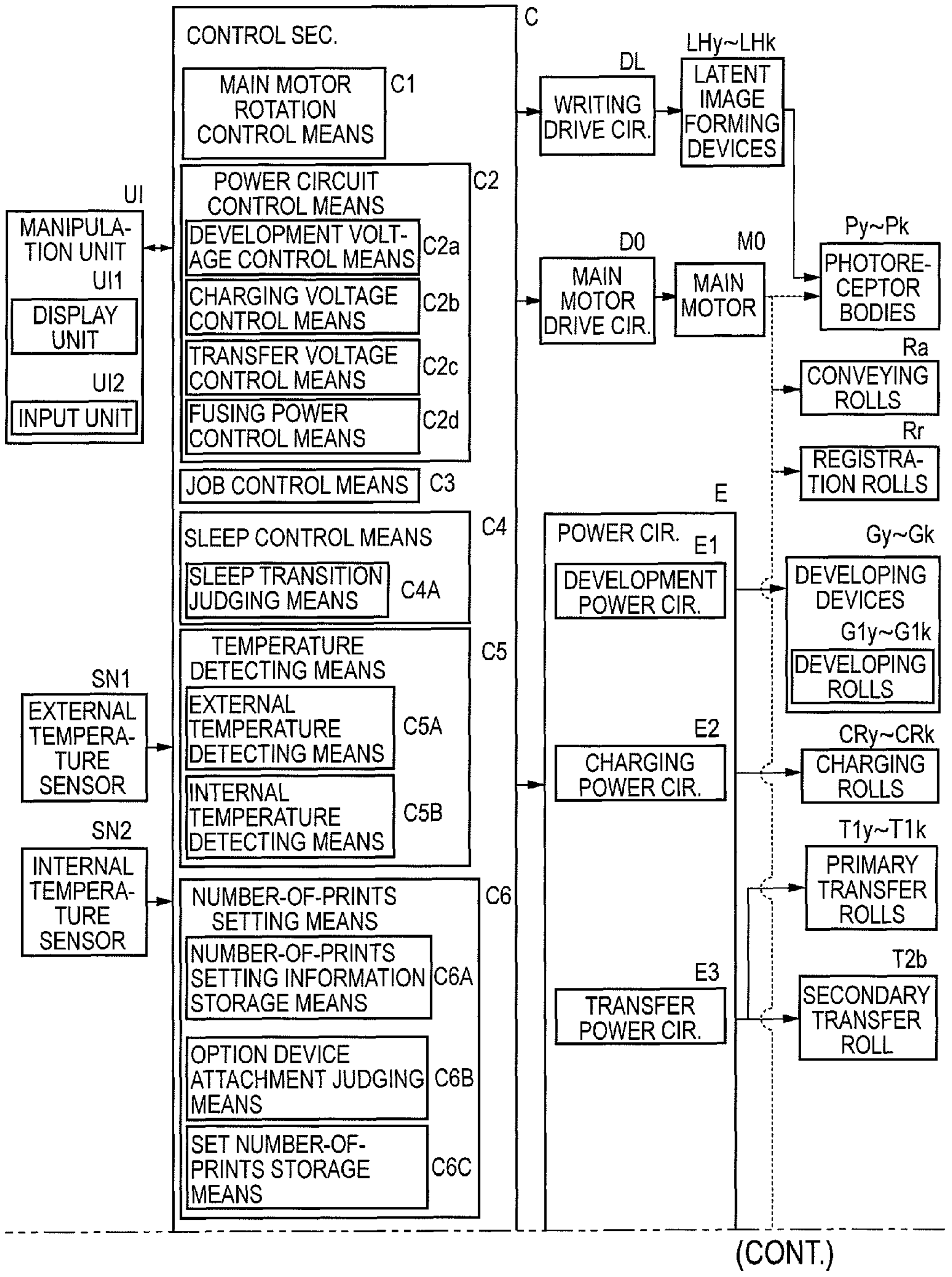
FIG. 4 shows an important part of a control section used in the first exemplary embodiment.

FIG. 4 shows an important part of the control section C used in the first exemplary embodiment.

The control section C is composed of an input/output (I/O) interface which performs signal input/output with the outside, adjusts input/output signal levels, and performs other operations, a read-only memory (ROM) stored with programs, information, etc. for execution of necessary processes, a random access memory (RAM) for temporary storage of necessary data, a central processing unit (CPU) which executes processes according to the programs stored in the ROM, and a small information processing device (microcomputer) having an oscillator etc. The control section C may perform various functions by running the programs stored in the ROM.

(Signal Input Elements Connected to Control Section C)

Output signals of a manipulation unit UI, an external temperature sensor SN1, an internal temperature sensor SN2, etc. (example signal input elements) are input to the control section C.

Manipulation unit UI:

The manipulation unit UI is equipped with a display unit UI1 and an input unit UI2 having arrow buttons, an enter button, etc. (example input members).

External Temperature Sensor SN1:

The external temperature sensor SN1 measures an external temperature T2 of the apparatus body U1, that is, a room temperature of a place where the printer U is installed.

Internal Temperature Sensor SN2:

The internal temperature sensor SN2 measures an internal temperature T1 of the apparatus body U1 in which it is disposed.

(Control Subject Elements Connected to Control Section C)

The control section C outputs control signals to the following control subject elements.

Writing Drive Circuit DL:

The writing drive circuit DL forms electrostatic latent images on the surfaces of the photoreceptor bodies Py-Pk by driving the LED heads LHy-LHk.

Main Motor Drive Circuit D0:

A main motor drive circuit D0 (example main drive source drive circuit) rotationally drives the photoreceptor bodies Py-Pk, the developing rolls G1*y*-G1*k* of the developing devices Gy-Gk, the heating roll Fh, the conveying rolls Ra, the registration rolls Rr, etc. via gears (not shown) by driving a main motor M0.

Power Circuit E:

The power circuit E has the following circuits.

Development Power Circuit E1:

A development power circuit E1 applies development voltages to the developing rolls G1*y*-G1*k* of the developing devices Gy-Gk.

Charging Power Circuit E2:

A charging power circuit E2 applies charging voltages to the charging rolls CRy-CRk.

Transfer Power Circuit E3:

A transfer power circuit E3 applies transfer voltages to the primary transfer rolls T1*y*-T1*k* and the secondary transfer roll T2*b*.

Fusing Power Circuit E4:

A fusing power circuit E4 supplies fusing power to a heater (not shown) of the heating roll Fh.

Fan Drive Circuit D1:

A fan drive circuit D1 (example transport device drive circuit) drives the fan U4.

Flip Control Circuit D2:

A flip control circuit D2 (example first option device control circuit) drives the conveying roll Ra of the flipping unit U5.

Option Sheet Supply Tray Unit Control Circuit D3:

An option sheet supply tray unit control circuit D3 (example second option device control circuit) drives the sheet supply roll Rp' and the elevation plate PL1' of the option sheet supply tray unit U6.

(Functions of Control Section C)

The control section C is provided with function implementing means which are programs for implementing functions of outputting control signals to the above-described individual control elements by executing processes corresponding output signals of the above-described individual signal output elements. The function implementing means for implementing the functions of the control section C will be described below.

Main Motor Rotation Control Means C1:

A main motor rotation control means C1 (example main drive source control means) controls the rotation of the photoreceptor bodies Py-Pk, the developing rolls G1*y*-G1*k* of the developing devices Gy-Gk, the fusing device F, etc. by controlling the main motor drive circuit D0.

Power Circuit Control Means C2:

Provided with the following means C2*a*-C2*d*, the power circuit control means C2 controls the development voltages, the charging voltages, the transfer voltages, the on/off switching of the heater of the heating roll Fh, and other things by controlling the power circuit E.

Development Voltage Control Means C2*a:*

A development voltage control means C2*a* controls the development voltages to be applied to the developing rolls G1*y*-G1*k* of the developing devices Gy-Gk by controlling the development power circuit E1.

Charging Voltage Control Means C2*b:*

A charging voltage control means C2*b* controls the charging voltages to be applied to the charging rolls CRy-CRk by controlling the charging power circuit E2.

Transfer Voltage Control Means C2*c:*

A transfer voltage control means C2*c* controls the transfer voltages to be applied to the transfer rolls T1*y*-T1*k* by controlling the transfer power circuit E3.

Fusing Power Control Means C2*d:*

A fusing power control means C2*d* controls the fusing temperature by on/off-controlling the heater of the heating roll Fh by controlling the fusing power circuit E4.

Job Control Means C3:

A job control means C3 (example image forming operation control means) carries out a job which is an image forming operation by controlling the LED heads LHy-LHk, the photoreceptor bodies Py-Pk, the transfer rolls T1*y*-T1*k* and T2*b*, the fusing device F, etc. according to inputs from the personal computer PC.

Sleep Control Means C4:

Provided with a sleep transition judging means C4A (example transition-to-power-saving-mode judging means), a sleep control means C4 (example power saving control means) performs controls relating to a sleep mode (example power saving mode) in which the supply of power to the individual members etc. inside the printer U excluding, for example, sections for receiving information from the manipulation unit UI and the personal computer PC.

Sleep Transition Judging Means C4A:

The sleep transition judging means C4A judges whether a time to make a transition to the sleep mode has arrived. In the first exemplary embodiment, the sleep transition judging means C4A judges that a time to make a transition to the sleep mode has arrived when a preset time has elapsed since the end of a job without a start of another job. In the first exemplary embodiment, the sleep transition judging means C4A judges that a time to finish the sleep mode has arrived when information is received from the personal computer PC or an input is made from the manipulation unit UI.

Temperature Detecting Means C5:

Provided with an external temperature detecting means C5A and an internal temperature detecting means C5B, a temperature detecting means C5 detects temperatures on the basis of detection results of the temperature sensors SN1 and SN2.

External Temperature Detecting Means C5A:

The external temperature detecting means C5A detects the external temperature T2 on the basis of a detection result of the external temperature sensor SN1.

Internal Temperature Detecting Means C5B:

The internal temperature detecting means C5B detects the internal temperature T1 of the printer U on the basis of a detection result of the internal temperature sensor SN2.

Number-of-Prints Setting Means C6:

Provided with a number-of-prints setting information storage means C6A, an option device attachment judging means C6B, and a set number-of-prints storage means C6C, a number-of-prints setting means C6 sets a print threshold value Na (example set number of prints) for a judgment to be made in controlling the fan U4. In the first exemplary embodiment, the number-of-prints setting means C6 sets a print threshold value Na according to the external temperature T2 and the presence/absence of the option devices U5 and U6 using a setting table which is stored in the number-of-prints setting information storage means C6A.

FIG. 5 shows the setting table used in the first exemplary embodiment.

Number-of-Prints Setting Information Storage Means C6A:

The number-of-prints setting information storage means C6A is stored with a setting table Tb (example number-of-prints setting information) which is a corresponding relationship between the external temperature T2, the presence/absence of the option devices U5 and U6, and the print threshold value Na. As shown in FIG. 5, in the setting table Tb used in the first exemplary embodiment, 1 IMP (number of printed images) corresponds to a print of one A4 image. When images of a size other than the A4 size have been printed, conversion is made to a number of A4 images. The print threshold value Na is 60 IMP when the external temperature T2 is high (higher than 28° C.) and the option devices U5 and U6 are attached. The print threshold value Na is 74 IMP when the external temperature T2 is low (lower than or equal to 28° C.) and the option devices U5 and U6 are attached. The print threshold value Na is 90 IMP when the external temperature T2 is high (higher than 28° C.) and neither of the option devices U5 and U6 is attached. The print threshold value Na is 120 IMP when the external temperature T2 is low (lower than or equal to 28° C.) and neither of the option devices U5 and U6 is attached.

Option Device Attachment Judging Means C6B:

The option device attachment judging means C6B judges whether one or both of the option devices U5 and U6 are attached. In the first exemplary embodiment, the option device attachment judging means C6B judges whether or not the option devices U5 and U6 are attached by detecting whether the control circuits D2 and D3 are electrically connected to the control section C, respectively.

Set Number-of-Prints Storage Means C6C:

The set number-of-prints storage means C6C stores the print threshold value Na (example set number of prints) that is set by the number-of-prints setting means C6. In the first exemplary embodiment, the set number-of-prints storage means C6C stores a print threshold value Na that has been set by the number-of-prints setting means C6 using the setting table Tb according to a external temperature detected by the external temperature detecting means C5A and presence/absence of the option devices U5 and U6 judged by the option device attachment judging means C6B. Therefore, in the first exemplary embodiment, a print threshold value Na for high temperature is set when the external temperature T2 is higher than 28° C. (example setting temperature). A print threshold value Na for low temperature which is larger than the print threshold value Na for high temperature is set when the external temperature T2 is lower than or equal to 28° C. And a smaller print threshold value Na is set when the option devices U5 and U6 are attached than when neither of the option devices U5 and U6 is attached.

Counting Means C7:

A counting means C7 counts a cumulative number N1 of prints (example number of image forming operations). In the first exemplary embodiment, the counting means C7 increases the cumulative number N1 (IMP) of prints every time one image is printed in a job by a number as converted into a number of A4 images.

Cumulative-Number-of-Prints Initializing Means C8:

Provided with a standby time measuring means C8A, an accumulation initialization threshold value storage means C8B, and a standby time judging means C8C, a cumulative-number-of-prints initializing means C8 initializes the cumulative number N1 of prints. In the first exemplary embodiment, when a new job is started, if a preset time has elapsed, the cumulative-number-of-prints initializing means C8 initializes the cumulative number N1 of prints, that is, resets it to 0.

Standby Time Measuring Means C8A:

The standby time measuring means C8A measures a standby time t1 for which the printer U has been in a standby state (example time that has elapsed until the start of a new job). In the first exemplary embodiment, the standby time measuring means C8A start measuring a standby time t1 upon the end of an image forming operation. That is, a time from the end of an image forming operation to the start of a new job is measured as a standby time t1.

Accumulation Initialization Threshold Value Storage Means C8B:

The accumulation initialization threshold value storage means C8B is stored with an initialization time ta (example threshold value) to be used for a judgment as to whether or not the cumulative-number-of-prints initializing means C8 should perform initialization. In the first exemplary embodiment, the accumulation initialization threshold value storage means C8B is stored with an initialization time ta of 15 minutes, for example.

Standby Time Judging Means C8C:

The standby time judging means C8C judges whether or not a measured standby time t1 is longer than or equal to the initialization time ta. In the first exemplary embodiment, the standby time judging means C8C judges whether or not a standby time t1 measured by the standby time measuring means C8A is longer than or equal to the initialization time ta, when a job has been started.

End Confirmation flag FL1:

The initial value of an end confirmation flag FL1 (example end information storage means) is "0." The end confirmation flag FL1 is made "1" when a job has finished normally, and is made "0" when a new job is started and processing of judging whether or not the preceding job has finished normally has been performed. As such, in the first exemplary embodiment, the use of the end confirmation flag FL1 corresponds to storage of data "0" or "1" (example end information) indicating whether or not a job has finished normally.

End Information Judging Means C9:

When a job has been started, an end information judging means C9 judges whether end information is stored or not. In the first exemplary embodiment, the end information judging means C9 judges whether the end confirmation flag FL1 is "1" or not and thereby judges whether the preceding job finished normally or was terminated abnormally due to a power failure, a sheet jam, or the like.

End Information Setting Means C10:

Every time a job has finished, an end information setting means C10 makes a setting for storing end information in the end information storage means, that is, sets the end confirmation flag FL1 to "1" if the job has finished normally. And the end information setting means C10 makes a setting for initializing the end information, that is, sets the end confirmation flag FL1 to "0", when the end information judging means C9 has made a judgment.

Temperature Difference Judging Means C11:

If the end information judging means C9 judges that the end information is initialized, that is, the end confirmation flag FL1 is "0," a temperature difference judging means C11 judges whether or not the temperature difference between the external temperature T2 and the internal temperature T1 of the printer U is larger than or equal to a temperature difference judgment value Ta (example preset temperature difference). In the first exemplary embodiment, the temperature difference judgment value Ta is set at 1° C., for example. That is, in the first exemplary embodiment, if a new job is started after the preceding job was terminated abnormally, the temperature difference judging means C11 judges whether or not the temperature difference between the external temperature T2 and the internal temperature T1 is small, which means that a sufficient time has elapsed since the abnormal termination and the inside of the printer U is cooled.

Transport Control Means C12:

Provided with an operation start judging means C12A and a fan rotation flag FL2 (example operation state storage means), a transport control means C12 controls the start and stop of operation of the fan U4. In the first exemplary embodiment, the transport control means C12 keeps the fan U4 stopped when a job is started, and starts the fan U4 when the cumulative number N1 of prints has become larger than or equal to the print threshold value Na. If the temperature difference T1-T2 is smaller than or equal to the temperature difference threshold value Ta, the transport control means C12 keeps the fan U4 stopped when the job is started and starts the fan U4 when the cumulative number N1 of prints has become has become larger than or equal to the print threshold value Na. On the other hand, if the temperature difference T1-T2 is larger than the temperature difference threshold value Ta, the transport control means C12 starts the fan U4 when an image forming operation is started.

Operation Start Judging Means C12A:

The operation start judging means C12A judges whether to start the fan U4. The operation start judging means C12A judges whether or not a time to start the fan U4 has arrived by judging whether or not the cumulative number N1 of prints has become larger than or equal to the print threshold value Na.

Fan Rotation Flag FL2:

The initial value of the fan rotation flag FL2 is "0." The fan rotation flag FL2 is made "1" when the fan U4 has been started, and is kept "0" while the fan U4 is stopped. As such, the use of the fan rotation flag FL2 corresponds to storage of data indicating whether or not the fan U4 is in operation.

(Process Executed by Printer U)

Next, a process which is executed by the printer U according to the first exemplary embodiment of the invention will be described with reference to a flowchart.

(Fan Control Process)

Figure 6:
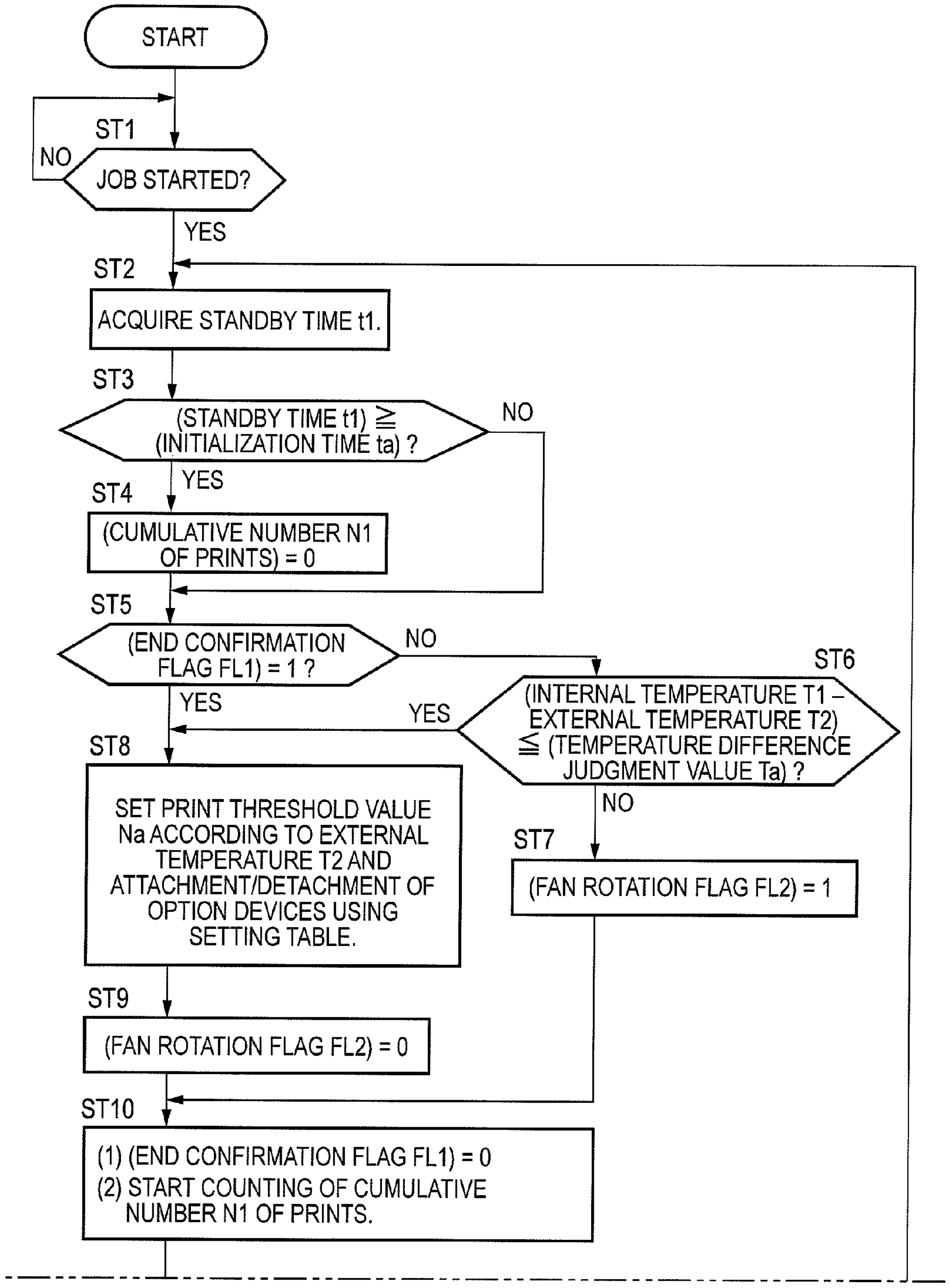
FIG. 6 is a flowchart of a fan control process (example transport control process) according to the first exemplary embodiment.

FIG. 6 is a flowchart of a fan control process (example transport control process) according to the first exemplary embodiment.

The individual steps shown in FIG. 6 are executed according to a program stored in the ROM of the control section C. This process is executed parallel with other various processes of the printer U such as a number-of-prints incrementing process of incrementing the number of prints every time one image is printed (multitasking). No drawing is provided for the number-of-prints incrementing process and it will not be described in detail because it is a process of merely incrementing the cumulative number N1 of prints every time one image is printed by a number as converted into a number of A4 images The process of FIG. 6 is started upon power-on of the printer U.

At step ST1, it is judged whether a job has been started or not. The process moves to step ST2 if the judgment result is affirmative, and returns to step ST1 if the judgment result is negative.

At step ST2, a standby time t1 being measured is acquired

At step ST3, it is judged whether or not the standby time t1 is longer than or equal to the initialization time ta. The process moves to step ST4 if the judgment result is affirmative, and moves to step ST5 if the judgment result is negative.

At step ST4, the cumulative number N1 of prints is initialized to 0 (N1=0).

At step ST5, it is judged whether the end confirmation flag FL1 is "1" or not. The process moves to step ST6 if the judgment result is negative, and moves to step ST8 if the judgment result is affirmative.

At step ST6, it is judged whether a temperature difference which is an internal temperature T1 minus an external temperature T2 is smaller than or equal to the temperature difference judgment value Ta. The process moves to step ST7 if the judgment result is negative, and moves to step ST8 if the judgment result is affirmative.

At step ST7, the fan rotation flag FL2 is set to "1."

At step ST8, a print threshold value Na is set according to the external temperature T2 and attachment/detachment of the option devices U5 and U6 using the setting table Tb.

At step ST9, the fan rotation flag FL2 is set to "0."

At step ST10, the following substeps are executed:

(1) The end confirmation flag FL1 is set to "0."

(2) Counting of the cumulative number of prints is started.

At step ST11, it is judged whether the fan rotation flag FL2 is "1" or not. The process moves to step ST12 if the judgment result is affirmative, and moves to step ST14 if the judgment result is negative.

At step ST12, it is judged whether the fan U4 is being driven. The process moves to step ST13 if the judgment result is negative, and moves to step ST14 if the judgment result is affirmative.

At step S13, driving of the fan U4 is started.

At step S14, it is judged whether or not the cumulative number N1 of prints is larger than or equal to the print threshold value Na. The process moves to step ST15 if the judgment result is affirmative, and moves to step ST16 if the judgment result is negative.

At step ST15, the fan rotation flag is set to "1."

At step S16, it is judged whether the job has finished or not. The process moves to step ST17 if the judgment result is affirmative, and returns to step ST11 if the judgment result is negative.

At step ST17, the following substeps are executed:

(1) The fan U4 is stopped.

(2) The end confirmation flag FL1 is set to "1."

(3) The standby time t1 is initialized to 0 and then starts to be measured.

At step ST18, it is judged whether or not a transition has been made to the sleep mode. The process moves to step ST19 if the judgment result is negative, and returns to step ST1 if the judgment result is affirmative.

At step ST19, it is judged whether or not a new job has been started. The process returns to step ST2 if the judgment result is affirmative, and returns to step ST18 if the judgment result is negative.

(Workings of Printer U)

In the printer U (example image forming apparatus) according to the first exemplary embodiment which have the above-described constituent elements, when a job (image forming operation) has been started and a print threshold value Na has been set, the job is carried out without driving of the fan U4 until the cumulative number N1 of prints becomes equal to the print threshold value Na. Therefore, the fan U4 is not caused to operate in the case where the number of images to be printed at one time is small and the inside of the apparatus body U1 may be cooled or heat may be discharged sufficiently even without operation of the fan U4 or fresh air is introduced and ozone etc. are not generated so much as to require their transport. As a result, the number of times of unnecessary operation of the fan U4, the power consumption, and the noise sound level may be made lower than in a configuration in which fans operate throughout an image forming operation.

When the cumulative number N1 of prints has become larger than or equal to the print threshold value Na, the fan U4 is caused to operate to start cooling. That is, when the number of images to be printed at one time is large and hence cooling etc. is necessary, the fan U4 is caused to operate to cool the inside of the apparatus body U1.

In a method that is commonly employed, the start and stop of operation of a fan are controlled by measuring temperatures of positions where heat sources of the apparatus body U1 such as the control board SC and driving portions, sliding portions, and motors of the image forming devices UY-UK or sensors etc. that are vulnerable to heat. However, in this case, it is necessary to dispose temperature sensors at desired temperature measurement positions but spaces for installation of the temperature sensors may not be available or such spaces would increase the size of the apparatus body U1 even if they are available.

In contrast, in the printer U according to the exemplary embodiment 1, even if the internal temperature sensor SN1 may not be disposed near heat sources or members that are vulnerable to heat, the fan U4 may be controlled according to the cumulative number N1 of prints. Size increase of the apparatus body U1 may thus be avoided.

In the printer U according to the exemplary embodiment 1, the print threshold value Na is set smaller when the external temperature T2 is high than when it is low. As a result, when the internal temperature of the apparatus body U1 likely becomes high, the fan U4 is caused to operate early to start cooling.

In the printer U according to the exemplary embodiment 1, the print threshold value Na is set smaller when the option devices U5 and U6 are attached than when they are not attached. As a result, the fan U4 is caused to operate early to start cooling, when the internal temperature of the apparatus body U1 likely becomes high because, for example, the option devices U5 and U6 generate heat as they operate and the control board SC generates heat as its power consumption increases.

In the printer U according to the exemplary embodiment 1, when the standby time t1 from the end of a job to the start of a new job is shorter than the initialization time ta, the cumulative number N1 of prints is not initialized. Therefore, the cumulative number N1 of prints is not initialized but continues to be incremented in the case where the interval to a new job is short and hence it is probable that the inside of the apparatus body U1 has not been cooled sufficiently even if the number of images to be printed in the single job is small. As a result, an event that the fan U4 is not started though the temperature of the inside of the apparatus body U1 becomes high may be avoided, whereby the probability that a resulting failure occurs in the printer U or the image quality is affected adversely is lowered.

Furthermore, in the printer U according to the exemplary embodiment 1, when the end confirmation flag FL1 is "0" which means that the preceding job was terminated abnormally due to due to a power failure, a sheet jam, or a like problem, the fan U4 is not started as long as the temperature difference between the internal temperature T1 and the external temperature T2 of the apparatus body U1 is lower than or equal to the temperature difference judgment value Ta which means that the inside of the apparatus body U1 is cooled sufficiently. On the other hand, if the temperature difference between the internal temperature T1 and the external temperature T2 is higher than the temperature difference judgment value Ta which means that the inside of the apparatus body U1 is not cooled sufficiently, the fan U4 is caused to operate to start cooling etc. irrespective of the cumulative number N1 of prints. As a result, the probability of occurrence of overheating may be made lower than in a case that the fan U4 is kept stopped though the inside of the apparatus body U1 is not cooled sufficiently.

(Modifications)

Although the exemplary embodiment of the invention has been described above, the invention is not limited to the exemplary embodiment and various modifications are possible without departing from the scope of the invention as defined by the claims. Modifications (H01)-(H10) to the exemplary embodiment will be described below.

(H01) Although the exemplary embodiment is directed to the printer as an image forming apparatus, the invention is not limited to such a case and may also be applied to a facsimile machine, a copier, or a multifunction machine having the functions of all or plural ones of those apparatus. The application range of the invention is not limited to color image forming apparatus but encompasses monochrome image forming apparatus.

(H02) Although the exemplary embodiment is directed to the case of using the intermediate transfer belt as an intermediate transfer body, the invention is not limited to such a case and an intermediate transfer drum may be used instead. Although the exemplary embodiment employs the transfer device which has the intermediate transfer body, the invention is not limited to such a case. For example, the intermediate transfer body may be omitted and toner images may be transferred directly from the photoreceptor bodies Py-Pk to a recording sheet S (transfer subject).

(H03) The charger cleaners CCy-CCk which are employed in the exemplary embodiment may be omitted.

(H04) Although in the exemplary embodiment a print threshold value Na is set according to an external temperature T2 and presence/absence of the option devices U5 and U6, the invention is not limited to such a case. A print threshold value Na may be a particular fixed value or may be set according to a condition other than the external temperature T2 and presence/absence of the option devices U5 and U6. For example, different print threshold values Na may be set for monochrome printing and multi-color printing or the print threshold value Na may be changed according to the number of attached ones of the option devices U5 and U6.

(H05) Although the exemplary embodiment uses the terms "larger (longer) than or equal to," "lower than or equal to," "higher than," and "smaller (shorter) than" in comparing numerical values, how to deal with boundary numerical values is not limited to the manners described in the exemplary embodiment and may be change arbitrarily according to designs, specifications, etc.

(H06) Although the exemplary embodiment employs the flipping unit U5 and the option sheet supply tray unit U6 as option devices, the invention is not limited to such a case. For example, an arbitrary known option device such as a hard disk drive, a RAM, or a manual feed tray may be employed.

(H07) It is desirable that different controls be performed depending on whether a preceding job finished normally or was terminated abnormally. However, it is possible to omit the judgment as to whether a preceding job finished normally or was terminated abnormally.

(H08) Although in the exemplary embodiment a print threshold value Na is set only once at step ST8 shortly after the start of a job, the invention is not limited to such a case. For example, it is possible to update the print threshold value Na during execution of a job in such a manner that, for example, the process returns step ST5 if the judgment result of step ST16 is negative. This configuration may accommodate a variation of the external temperature T2 during execution of a job.

(H09) Although the exemplary embodiment employs, as a transport device, the fan U4 which transports gas (example fluid), the invention is not limited to such a case. For example, a transport device for transporting a liquid, such as a heat pipe, may be employed. That is, the cooling method of the invention is not limited to air cooling and may be liquid cooling.

(H10) Although in the exemplary embodiment the number of printed images is counted as a parameter representing the number of image forming operations, the invention is not limited to such a case. For example, the number of rotations or the rotation time of the photoreceptor bodies Py-Pk, the LED heads LHy-LHk, the intermediate transfer belt B, or the like or the number of times of on/off switching of any of various power sources may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus comprising:

a transport device that transports fluid inside a body of an image forming apparatus;

a counting unit that counts a cumulative number of image forming operations;

a transport control unit that controls a start and a stop of operation of the transport device so as to keep the transport device stopped when an image forming operation is started, and to start the transport device when the cumulative number of image forming operations has become larger than or equal to a preset number, and a number setting unit that sets, as the preset number, a predetermined number for high temperature if an external temperature of the image forming apparatus is higher than a preset temperature, and that sets, as the preset number, a predetermined number for low temperature that is larger than the predetermined number for high temperature if the external temperature is lower than or equal to the preset temperature.

2. An image forming apparatus comprising:

a transport device that transports fluid inside a body of an image forming apparatus;

a counting unit that counts a cumulative number of image forming operations;

a transport control unit that controls a start and a stop of operation of the transport device so as to keep the transport device stopped when an image forming operation is started, and to start the transport device when the cumulative number of image forming operations has become larger than or equal to a preset number, an option device which gives an additional function to the image forming apparatus when attached to the body of the image forming apparatus in a detachable manner; and a number setting unit, wherein the number setting unit sets, as the preset number, a smaller number when the option device is attached than when the option device is not attached.

3. An image forming apparatus comprising:

a transport device that transports fluid inside a body of an image forming apparatus;

a counting unit that counts a cumulative number of image forming operations;

a transport control unit that controls a start and a stop of operation of the transport device so as to keep the transport device stopped when an image forming operation is started, and to start the transport device when the cumulative number of image forming operations has become larger than or equal to a preset number, an end information storage unit that stores end information having a first value indicating that a preceding image forming operation finished normally;

an end information judging unit that judges whether end information having the first value is stored in the end information storage unit when an image forming operation is started;

an end information setting unit that makes a setting of storing end information having the first value in the end information storage unit every time an image forming operation finishes normally, and that makes a setting of initializing the end information when the end information judging unit has made a judgment; and a temperature difference judging unit that judges whether a temperature difference between an external temperature and an internal temperature of the image forming apparatus is smaller than or equal to a preset temperature difference when the end information judging unit judges that the end information is initialized, wherein if the temperature difference is smaller than or equal to the preset temperature difference, the transport control unit keeps the transport device stopped when an image forming operation is started and starts the transport device when the cumulative number of image forming operations has become larger than or equal to the preset number; and if the temperature difference is larger than the preset temperature difference, the transport control unit starts the transport device when an image forming operation is started.

* * * * *